Jan. 29, 1952     M. M. CANNON, JR     2,583,629
FOREHEARTH CONSTRUCTION
Filed Jan. 29, 1947

INVENTOR
MADISON M. CANNON JR.

BY *Perham & Bates*

ATTORNEYS

Patented Jan. 29, 1952

2,583,629

UNITED STATES PATENT OFFICE 2,583,629

FOREHEARTH CONSTRUCTION

Madison M. Cannon, Jr., West Hartford, Conn., assignor to Emhart Manufacturing Company, a corporation of Delaware Application January 29, 1947, Serial No. 725,097

2 Claims. (Cl. 49—54)

This invention relates to improvements in forehearths for receiving molten glass from a melting tank or like source of supply and for conducting such glass to a delivery chamber, such as a feed bowl or basin located at the outer end of the forehearth, and from which glass is to be fed, gathered or otherwise removed.

The invention more particularly relates to improvements in forehearths of that type which have a rear or upstream so-called cooling section and a forward or downstream so-called heating or homogenizing section, the outer end portion of which constitutes the delivery chamber of the forehearth.

Heretofore, in the operation of forehearths of this type, cooling has been effected and the temperature regulated in the cooling section in a variety of ways, all of which involve heat conduction, or radiation, or both. Examples of practices heretofore used with success are described in Patent No. 2,139,911 granted December 13, 1938, to Peiler et al. and Patent No. 2,144,973 granted January 24, 1939, to Honiss. For a more complete appreciation of the present invention, reference should be made to those patents.

In the operation of forehearths of the type to which reference has been made, the temperature of the glass in the cooling section is regulated primarily, as the designation of the section implies, by cooling, with a view to obtaining for all the glass leaving the cooling section an average temperature corresponding to the temperature desired at the outlet or point of removal of glass from the delivery chamber. During the travel of such glass through the outer or homogenizing section, an attempt is made to eliminate temperature differences between different portions of the glass while preventing or compensating for further further loss of heat from the glass. This may be done by applying a regulated amount of heat to the glass in the homogenizing section, the object being to allow all the glass to even out as to temperature, or uniformly attain the temperature desired and to be homogeneous while in the delivery chamber or at least when in that portion of the delivery chamber that contains the feed outlet or place at which glass is to be removed.

Since the glass moving from a melting tank or like source of supply through the forehearth to the delivery chamber tends to become cooler and to flow more slowly next to the walls of the forehearth channel, it is usual to provide some means in an attempt to bring the temperature and rate of flow of the side or edge portions of the stream and of the remainder of the stream into substantial correspondence. Such means may comprise means for permitting cooling of the middle portion of the glass, as by radiation to and conduction through the top wall of the cooling section of the forehearth while heat loss from the glass of the side or edge portions of the stream is substantially reduced or opposed, as by the application of heat thereto.

The temperature of the glass passing from the refining end of a melting tank or like source of supply to a forehearth usually is higher than that desired at the outlet or point of removal of glass from the delivery chamber. The reduction of temperature to be effected may be relatively slight, as when the glass to be fed or otherwise removed is to be at a relatively high temperature, suitable for the production of small charges which are to be manufactured into small articles of glassware. When the charges are relatively large, as for the manufacture of larger articles of glassware, the reduction of temperature is greater and may be as much as 300 to 400 degrees greater than the reduction required for charges for small ware.

The types of glass, i. e., high and low temperature glasses are additional factors which further increase the temperature operating range necessary in a foreheath which will satisfy all possible service conditions. Also, the temperature of the glass entering the foreheath may be different in different installations and even at different times in the same installation. Still further, the factors governing the condition of the glass will be different when the output of glass from the delivery chamber per unit of time is varied, even though there has been no change of temperature in the glass entering the forehearth and the same temperature is desired at the feed outlet or point of delivery of glass from the delivery chamber.

The aforementioned patents to Peiler et al, and to Honiss disclose forehearth constructions and methods of operation which have given satisfactory operation over a wide range of service conditions. In the former patent, cooling is effected by radiation of heat from the molten glass to the roof of the cooling section and by conduction and radiation through and from the roof. The transfer of heat through the roof by conduction may slow up the cooling to a considerable degree. However, the patent points out that, if necessary, a higher cooling rate can be established by enlarging the size of the upstream cooling section of the forehearth relative to the downstream heating or homogenizing section, or by forced circulation of a cooling medium, such as air, through small spaced ports into the forehearth and out through spaced exhaust ports in the top of the cooling section in the manner taught by the patent to Honiss. The cooling medium under forced draft may remove a considerable amount of heat from the forehearth and carry it out the vents provided therefor, thus reducing the amount of heat which must be transferred by conduction through and radiation from the roof.

In some instances, particularly where high temperature melts are being run or the chemical composition of the glass may be such that corrosive gases are discharged which attack the refractory material commonly used in forehearth construction, the forced circulation of coolant may accelerate deterioration of the refractory materials which form the vents and associated ducts and passages.

The present invention provides for the necessary temperature control of the cooling sections without utilizing forced circulations and, at the same time, obtains a maximum use of heat transfer by radiation from the cooling section.

For a more complete understanding of the present invention, the distinction between heat transfer by radiation as contrasted with transfer by conduction should be borne in mind. In the latter the transfer is by direct transfer to a contacting medium while in the former the transfer is made directly to a material spaced from and at which the heat source "looks." For example, when a highly heated body such as the sun "looks" at a colder body, such as the earth, heat is transmitted by radiation to the latter. This radiant transfer of heat is made entirely apart from any transfer through direct contact or through an intermediate or conveying medium, such as air, which touch first the one and then the other. Heat transferred by radiation travels at the speed of light whereas heat transferred by means of a conveying medium, such as air, moves, even under forced draft, with the air which travels at much slower speed than radiant energy.

The present invention utilizes the faster or radiant transfer to a considerable degree in combination with natural circulation of a cooling medium. More particularly, provision is made for the surface of the cooling chamber roof which looks at the surface of the molten glass to be adjustably positionable so as, in turn, to look at or expose the ambient or colder materials and objects outside of the forehearth in variable quantity or area to the radiant energy of the roof surface. In accordance with this invention the roof surface is so located as to look at all or substantially all the molten glass surface and it is possible to dissipate a maximum amount of heat energy quickly by radiant transfer.

The present invention has the further advantage of providing for control of cooling at regulable rates which may be substantially uniform throughout the cooling section or regulably varied as desired.

A still further advantage is the provision of maximum natural draft cooling which may be effected more uniformly than heretofore, and varied more uniformly throughout the length of the cooling section as operating conditions may require.

Still another advantage is the simultaneous regulation of cooling both by natural draft and by radiant heat loss which may be effected by a single adjustment of the entire roof structure.

Other advantages will hereafter be pointed out or will become apparent from the following description of an embodiment of the invention, as shown in the accompanying drawings, in which.

Figure 1:
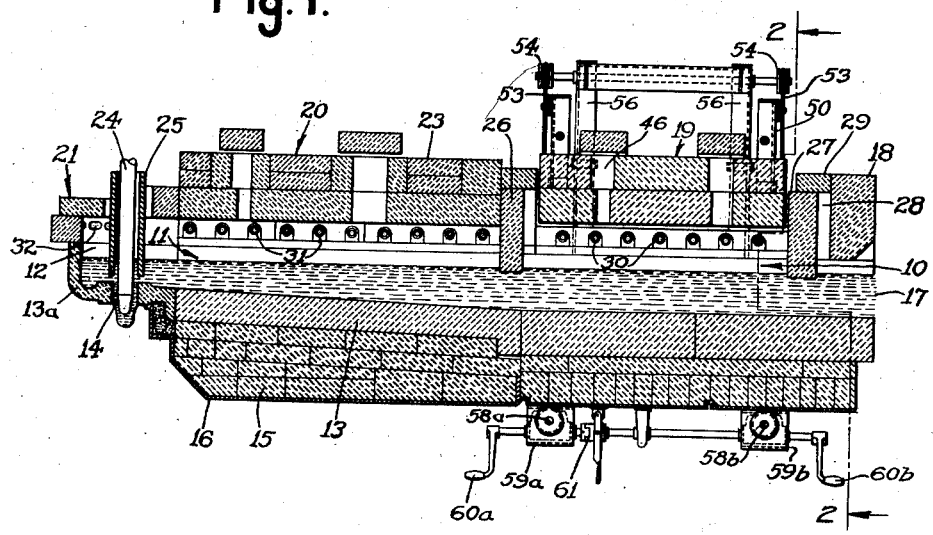
Figure 1 is a longitudinal vertical section along line 1—1 of Fig. 2, illustrating a forehearth provided with glass temperature controlling and conditioning means embodying the invention.

Referring now more particularly to Fig. 1, a forehearth is shown as comprising a rear or so-called cooling section 10 and an outer or forward so-called heating or homogenizing section 11. The outer end portion of the section 11 constitutes a delivery chamber, designated 12.

The side walls and bottoms of the forehearth sections 10 and 11 are formed of suitable refractory blocks or members suitably connected to constitute a refractory flow channel 13. The outer end portion of this flow channel, indicated at 13a, is shown as being a refractory feed bowl which is provided at its bottom with a feed outlet 14. The refractory channel 13 is suitably insulated at all places desired, as by the insulating brick 15 which may be confined and held in place against the refractory channel by a suitable metallic casing, such as indicated at 16.

In Fig. 1, the feed bowl 13a lacks insulation, but it will be understood that in actual practice, insulation of any suitable kind may be applied and held in place in any suitable known way. Also, in actual practice, suitable supporting structure (not shown) will be provided for the forehearth and the forehearth will be so located with respect to a melting tank or like source of supply that glass will be supplied continuously in a stream, as indicated at 17 in Fig. 1, from the source of supply to the forehearth. The flow channel thus will be continuously filled with molten glass to a predetermined level, sufficient to maintain over the feed outlet a body of glass of sufficient depth for the feeding operations.

Only a portion of a wall of the melting tank is shown, the same being indicated at 18 in Fig. 1, as the present invention does not require any novel or special way of connecting the forehearth flow channel with the source of supply and ways of accomplishing this result are well known in the art.

The forehearth includes a cover or top structure, comprising a section 19 at the top of the rear or cooling section 10, a section 20 at the top of the heating or homogenizing section 11, and a section 21 at the top of the delivery chamber 12. Preferably the cover structure of the forehearth is so constructed as to provide substantially flat top walls for the several sections of the forehearth. The refractory inner walls of the section 20 of the cover structure may have insulating bricks superimposed thereon, as indicated at 23, Fig. 1.

A suitable vertical opening may be formed through the section 21 of the cover structure above the delivery chamber to accommodate suitable mechanism for controlling the feeding of glass through the outlet 14, such mechanism being represented by the vertical refractory plunger 24 and the vertical refractory tube 25.

Since feeding mechanism, including these parts, forms no part of the present invention and is well known in the art, no further illustration or description thereof is required.

The heating or homogenizing section of the forehearth may be separated, above the level of the glass in the forehearth channel, from the rear or cooling section 10 by a transverse refractory separator block 26. The space above the glass in the rear or cooling chamber 10 likewise may be separated from the space above the glass in the associate melting tank or source of supply by a rear transverse refractory block, such as indicated at 27. This block may be spaced slightly from the adjacent wall 18 of the associate melting tank to provide a space, such as indicated at 28, for the sting-out of heated gases, the outlet at the top of this space being controlled by a suitable movable refractory cover block 29.

The sections 10 and 11 and the delivery chamber 12 at the outer end of the latter may be provided with suitable heating means, preferably such as are included in the embodiment of the invention disclosed and claimed in the patent of Karl E. Peiler and William T. Barker, Jr., No. 2,139,911, issued December 13, 1938, which is owned by the owner of the present application. As shown, such heating means include closely spaced firing or combustion tunnels 30 located in the side walls of the cooling chamber 10, similar firing or combustion tunnels 31 in the side walls of the heating chamber 11 as far outwardly of the latter as the delivery chamber 12 and spaced firing or combustion tunnels 32 of a somewhat different form in the walls of the delivery chamber 12. All these firing or combustion tunnels are shown in Fig. 1 as being located a predetermined distance above the level of the glass in the forehearth.

Figure 2:
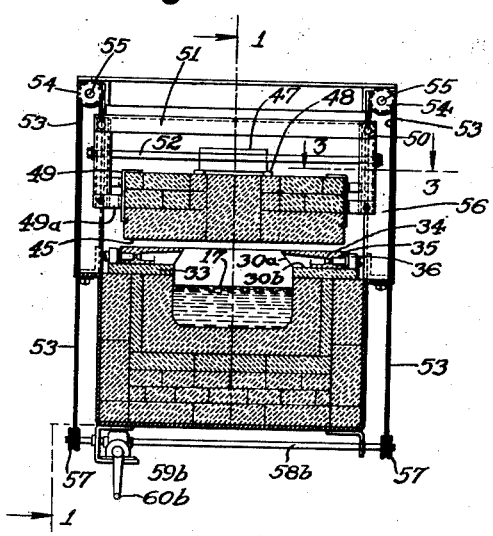
Fig. 2 is a cross-sectional view taken along the line 2—2 of Fig. 1.

It will be noted from the showing of the firing or combustion tunnels 30 in Fig. 2 that each is substantially enlarged at its inner end portion, has its inner end downwardly and outwardly beveled, as at 30a, and has its bottom wall cut away for a substantial distance outwardly of this beveled portion, as indicated at 30b, Fig. 2, the effective bottom of the outer end portion of the firing or combustion tunnel being the exposed surface of the underlying or supporting refractory block 33.

Each firing or combustion tunnel 30 has a reduced inlet, indicated at 34 in Fig. 2, at the inner end of a counterbore in which is disposed the tip 35 of a nozzle 36.

As described so far, the structure is substantially as shown in the aforementioned patent to Karl E. Peiler and William T. Barker, Jr., No. 2,139,911, which fully discloses and contains claims for patentably novel features thereof. Such structure has been described herein because it is particularly well adapted for cooperation with structure, hereinafter to be described, to produce a complete forehearth by which the objects of the present invention may be attained.

As shown, the section 19 of the cover structure for the cooling section 10 of the forehearth comprises refractory blocks arranged to constitute a flat crown 45 for the space above the glass in such cooling section. Spaced vertical vents or exhaust ports 46 are provided in this crown 45, preferably in the longitudinal median portion thereof.

Insulating bricks 47 surmount the vents 46, the bricks being spaced from the top of the arch 45 by means of the spacer blocks 48 so as to permit flow of flue gases through the vents to the atmosphere. The unsupported ends of the bricks 47 sufficiently overlie the vents 46 so that the bricks 47 reflect substantially all of the radiant energy from the molten glass back through the vents into the interior of the glass chamber while at the same time negligibly restricting natural circulation of air from the vents 46 to the outside atmosphere.

In accordance with the invention, means are provided for adjustably supporting and positioning the arch assembly 45 with respect to the forehearth. As shown in Figs. 1 and 2, the assembly of insulating brick constituting the arch or closure 45 is secured in its assembled position between a pair of laterally extending members 49 of U-shaped cross section having outwardly extending ears 49a to the outer ends of which are pivotally pinned upwardly extending vertical arms 50. In order for the lateral members 49 to exert gripping pressure on the arch 45, the upper ends of the forwardly and the rearwardly disposed pairs of arms 50 are pivotally secured respectively to the ends of connecting members 51 and the lower ends of each pair of arms drawn inwardly by a tie rod 52 to thereby clamp the arch 45 between the members 49.

As illustrated in Figs. 1 and 2, wire cables 53 support the arch assembly at its four corners. The cables pass over pulleys 54 at the ends of shafts 55 horizontally disposed at either side of the forehearth. These shafts are rotatably journaled in suitable mountings provided in fixed vertical suports 56. The cables 53 are secured to winch drums 57, the forward pair of cables being secured to drums disposed at opposite ends of a shaft 58a mounted beneath the forehearth and the rearward pair of cables being similarly secured to drums carried by a second shaft 58b. The shafts 58a and 58b may be rotated to raise or lower the arch 45, provision being made to raise or lower one end of the arch a greater or lesser amount than the other. To this end there are provided a pair of worm-gear assemblies 59a and 59b manually operable by cranks 60a and 60b respectively, and connectable for simultaneous movement through a clutch 61. Engagement of the clutch 61 permits both ends of the arch 45 to be simultaneously raised or lowered by rotation of either crank 60a or 60b whereas when the clutch 61 is disconnected the forward end of the arch can be raised or lowered independently by crank 60a and the rear end of the arch, likewise, can be independently raised or lowered by the crank 60b.

Figure 3:
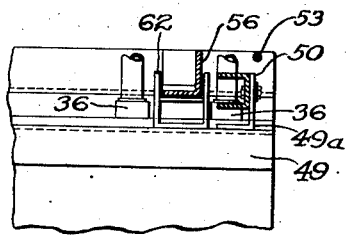
Fig. 3 is an enlarged cross-sectional plan view of a portion of the forehearth taken along line 3—3 of Fig. 2.

As best seen in Fig. 3, brackets 62 secured to the gripping members 49 are slidably engaged by the vertical supports 56 which thus act as guides to prevent lateral and fore-and-aft swinging movement of the arch 45 relative to the forehearth.

In the operation of a forehearth of the type illustrated and described, the arch or cover 45 for the cooling section of the forehearth may be adjusted so as to regulate the cooling conditions therein and regulate temperature under any contingency, both abnormal as well as normal, that is likely to be encountered in practice. For example, if the reduction of temperature of the glass passing through the cooling section of the forehearth is to be relatively slight, the cover or arch 45 can be located in its closed or very nearly closed position relative to the forehearth. In this position the amount of cooling air from the outside atmosphere entering the forehearth through the space between the arch and the forehearth will be zero or very nearly so. Heated gases passing out the vents 46 will be negligible and cooling by air circulation will be slight. Furthermore, the exposure of the under surface of the arch to the outside or ambient surroundings also will be either zero or small. Thus, heat losses by radiation from the under surface of the arch 45 to the outside will be correspondingly low. Of course, for any one position of the arch relative to the heating chamber, small changes in temperature may be effected by increasing or decreasing the application of heat from the burners. If, however, adjustment of the burners is insufficient to accomplish the desired cooling, the entire arch may be raised and the necessary temperature adjustment quickly obtained. It will be perceived that raising the arch not only will increase the circulation of cooling air entering through the continuous, uninterrupted space between the arch and the chamber and passing out through the vents 46, but in addition radiant energy from the molten glass absorbed by the arch will be quickly radiated from the undersurface of the arch to the much colder ambient outside of the forehearth. It will be seen that the arch is arranged to "look" at substantially the entire surface of the molten glass within the cooling section of the forehearth and consequently is adapted to dissipate a maximum of heat energy by radiation of the outside.

In addition to the rapid control provided, the present invention has the further advantage of providing for disproportionate heating or cooling in the section of the forehearth controlled by the adjustable radiant arch. Different cooling rates are readily established merely by raising or lowering the ends of the arch to different positions relative to each other. Thus when the rear end of the arch is disposed in a higher position than the forward end, a greater degree of cooling is obtained for the glass as it first enters the forehearth and a predetermined lesser cooling rate is established for the glass in the forward end of the cooling section prior to its passage into the homogenizing section of the forehearth.

It will be seen that the present invention provides a rapid temperature control utilizing radiant energy transfer.

The invention further provides for temperature control by air circulation or natural circulation without the attendant corrosive characteristic of a forced circulation system.

Having thus described the invention, what is claimed is:

1. A forehearth including a cooling section containing molten glass having a radiant surface, and a top structure movable into and out of substantially continuous contact with spaced walls of said cooling section, said top structure including a radiant surface which, between said spaced walls, looks at and unobstructedly covers all of said radiant glass surface and, in a raised position only, looks out of said forehearth, and wherein the top structure includes an upwardly extending passageway in communication with the atmosphere inside and outside the forehearth.

2. A forehearth including a cooling section containing molten glass having a radiant surface, and a top structure movable into and out of substantially continuous contact with spaced walls of said cooling section, said top structure including a radiant surface which, between said spaced walls, looks at and unobstructedly covers all of said radiant glass surface and, in a raised position only, looks out of said forehearth, and wherein the top structure includes an upwardly extending passageway in communication with the atmosphere inside and outside the forehearth, and an insulating brick surmounting said passageway and adapted to reflect radiant energy from the molten glass surface back through the passageway into the interior of the forehearth.

MADISON M. CANNON, Jr.

REFERENCES CITED

The following references are of record in the file of this patent:

UNITED STATES PATENTS

| Number | Name | Date |
| --- | --- | --- |
| 478,999 | Harper | July 19, 1892 |
| 1,656,869 | Peiler | Jan. 17, 1928 |
| 1,751,045 | Mambourg | Mar. 18, 1930 |
| 1,751,987 | Frink | Mar. 25, 1930 |
| 1,765,695 | Owens | June 24, 1930 |
| 1,818,231 | Mambourg | Aug. 11, 1931 |
| 1,912,149 | Latimer | May 30, 1933 |
| 2,042,852 | Koupal | June 2, 1936 |
| 2,064,546 | Kutchka | Dec. 15, 1936 |
| 2,384,073 | Campbell | Sept. 4, 1945 |